United States Patent [19]
Cormier

[11] Patent Number: 4,781,211
[45] Date of Patent: Nov. 1, 1988

[54] LOCK FOR A VALVE

[76] Inventor: George J. Cormier, 311 Madison St., Fitchburg, Mass. 01420

[21] Appl. No.: 740,496

[22] Filed: Jun. 3, 1985

[51] Int. Cl.[4] ............................................. F16K 35/00
[52] U.S. Cl. .................................... 137/383; 251/89; 70/189
[58] Field of Search ................... 137/384.2, 384.8, 383; 251/89, 102, 104, 111, 151; 403/100, 300, 383; 192/89 A, 93 R, 93 A, 114 R; 70/175, 188, 189, 218, 221-223

[56] References Cited

U.S. PATENT DOCUMENTS

| | | | |
|---|---|---|---|
| 1,552,586 | 9/1925 | Vanderlip | 70/189 |
| 2,881,789 | 4/1959 | Finazzo | 137/384.2 |
| 3,080,031 | 3/1963 | Young | 192/114 R |
| 3,515,250 | 6/1970 | Cantalupo | 192/114 R |
| 3,763,979 | 10/1973 | Goodman et al. | 192/89 A |
| 4,390,038 | 6/1983 | Salvato | 251/89 |

FOREIGN PATENT DOCUMENTS 1083166  1/1955  France ............................. 137/384.8

Primary Examiner—Martin P. Schwadron
Attorney, Agent, or Firm—Charles R. Fay

[57] ABSTRACT

A valve lock comprising a valve stem, a valve actuator stem axially alined therewith, square ends on the stems, a barrel clutch with a square interior selectively connecting or disconnecting the square ends of the stems, and a key to actuate the clutch barrel.

2 Claims, 1 Drawing Sheet

LOCK FOR A VALVE

BACKGROUND

In many cases of valve controlled flow it is indicated to lock or immobilize the valve to prevent unwanted shutoff or loss of fluid, especially where the valve is located in a place there it is accessible to unauthorized persons.

One way to do this is to place a built-in lock in the valve, but heretofore, the lock can be put out of use merely by hitting the valve handle or stem with an implement, breaking the lock.

This invention proposes to eliminate breaking of the lock by placing it where it cannot be affected by such adverse action.

SUMMARY

As an example of this invention, it is taken that the valve, of whatever usual construction, has a stem, which when rotated, opens or closes the valve. The valve is attached to a pipe which forms a communication between a source and an output or input.

The stem has a gap or interruption in it, so it in effect forms two axially aligned but completely separate parts. A key is provided to shift a coupling to connect the stem parts so that the valve can be turned on or off, or to shift the coupling to free it completely from one of the stem parts so that the valve cannot be moved. One stem part is connected permanently to the valve and is referred to as the valve stem, and the other stem part is connected to a stem actuator, e.g., a hand wheel or the like and is referred to as the valve actuator stem.

The coupling is a barrel that is interiorly non-circular and exteriorly circular or some other convenient shape. The two stem parts are correspondingly non-circular exteriorly and thus both stems non-rotationally accept the coupling which acts as a driver for the valve stem when coupled or clutched thereto upon rotation (or other actuation) of the valve actuator stem.

The key turns a lifting cam that impinges only on the near end edge of the coupling to move it out of contact with the valve stem, and it can be spring assisted in either or both directions, principally to insure engagement with the valve stem when the key is turned appropriately.

The point of this structure is that the valve actuator (hand wheel e.g.) can be struck by an implement but the impact will only be transmitted axially to the valve stem; the key and its cam cannot be damaged or even contacted because they are both out of line with the stem, so the lock cannot be broken by pounding on the valve stem actuator, which can be accomplished by known prior art devices.

PREFERRED EMBODIMENT OF THE INVENTION

Figure 1:
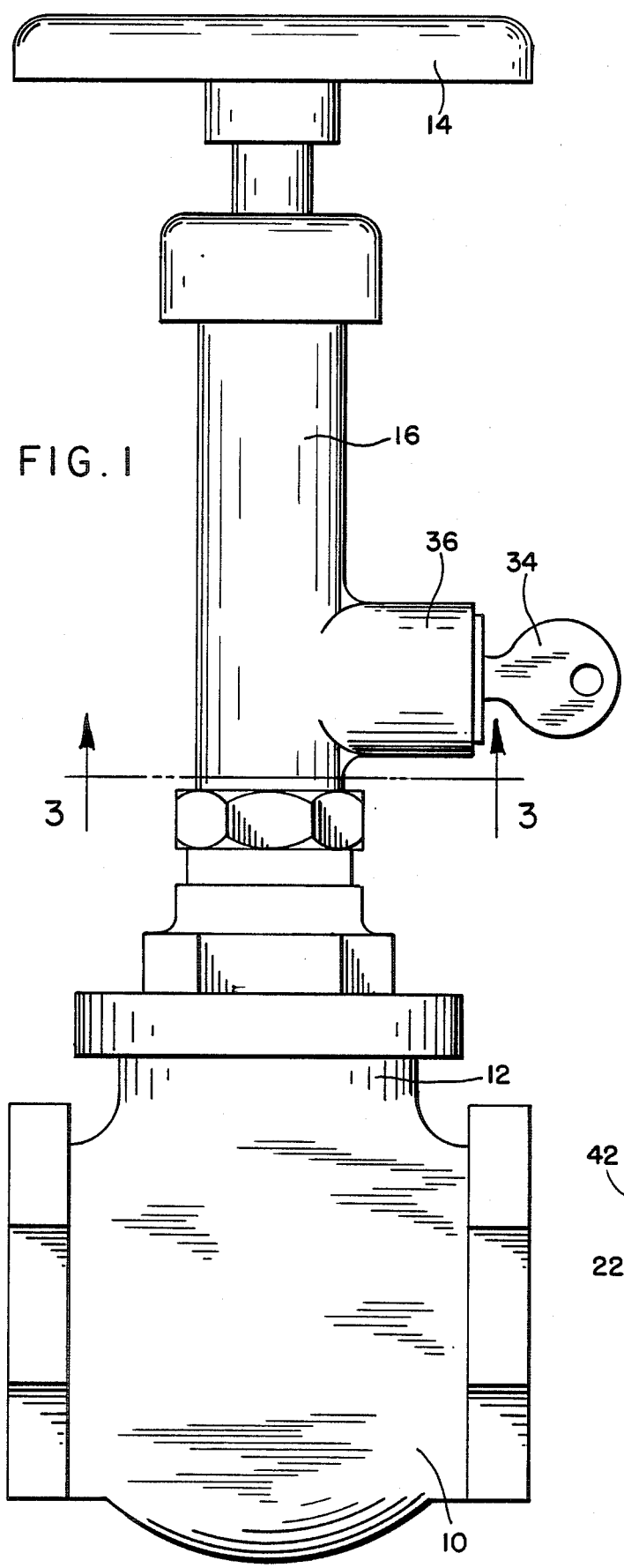
FIG. 1 is an elevational view of a generally conventional valve to which the invention is attached.

Most of the valve shown in FIG. 1 are conventional, e.g., bonnet 10, valve stem receptor 12, etc., and the valve parts in the bonnet not shown are well-known, and can include a gate valve, ball valve, rotary valve or whatever is used. The valve stem actuator is here shown as a hand wheel 14, connected to the valve stem in housing 16, and having a connection to the actual valve in the bonnet, as expected and clear to anyone.

The valve actuator stem 18 is shown as cylindrical having a square upper end 20 for connection to hand wheel 14 and a longer square lower end 22 terminating at 24. A collar 25 is secured to the stem 18 and forms an abutment for a coil compression spring 26 bearing on the upper end edge of a barrel 28 that is exteriorly cylindrical and square interiorly slidably fitting the square end 22 of stem 18 and also the square upper end 30 of stem part 32.

Thus it is clear that when coupling 28 is engaged with both stems 18 and 32, the hand wheel can be rotated to a purpose, opening or closing the valve, but when the coupling does not engage the square end 30 of stem 32, rotation of the hand wheel is ineffective.

A key is shown at 34 in a barrel 36. This key when turned rotates at least partly, say 180°, a lifter cam 38 by being engaged with a pin 40 in the side wall of housing 16. Cam 38 engages the lower end edge 42 of coupling 28 and does not lie anywhere in the path of either stem part 18, 22 or stem part 30, 32, and is thus protected from any blows down upon the hand wheel or valve stem. Blows may be translated from stem part 22 to stem 30, 32, but the coupling 28 and lock and key are protected from such action, which is the usual way that the prior art valve lock is broken.

Figure 2:
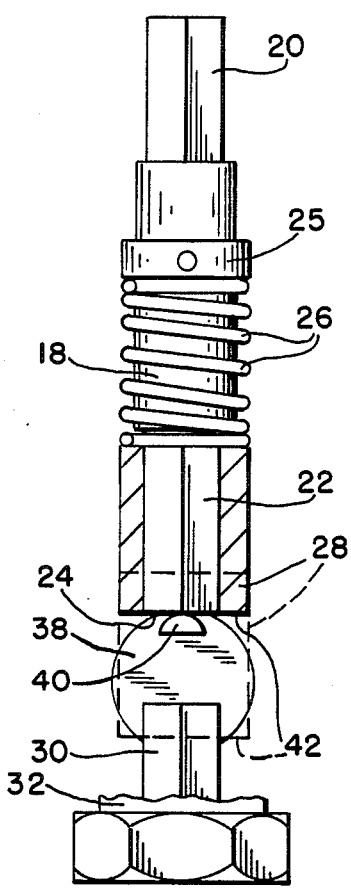
FIG. 2 is a detail view partly in section, of the novel valve stem and coupling parts.
Figure 3:
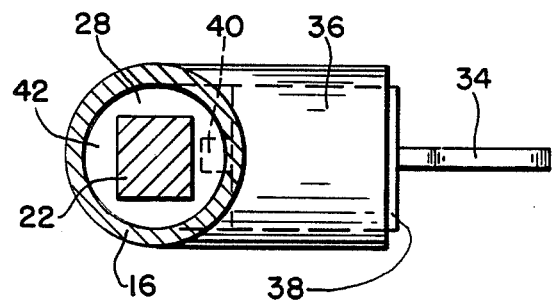
FIG. 3 is a section on line 3—3 in FIG. 1, on an enlarged scale.

By judiciously choosing the lengths of the square parts, 22, 28, and 30, the valve can be locked at various degrees of flow, not just at full closed. The pin 40 is mounted in the wall of housing 16, although this housing is not shown in FIG. 2 for clarity of illustration.

I claim:

1. A locking valve comprising a housing,
   a valve stem, a valve stem actuator associated with the housing, means mounting the stem for rotary motion under influence of the actuator, and a coupling on the actuator and movable thereon for selective engagement or disengagement from the valve stem, whereby the actuator fails to turn the stem when disengaged therefrom,
   the coupling being rotatively fixed relative to the actuator and being in the form of a sleeve thereon, means constantly tending to urge the coupling toward the stem and a smooth, uninterrupted edge on the coupling,
   means to move selectively the coupling away from the stem, disconnecting the stem from the actuator against the action of the constantly urging means, key operated means to actuate the selectively movable means,
   said key-operated means engaging only the smooth uninterrupted edge of the coupling so the decoupling and its actuator are freely rotatable when the coupling is disengaged from the stem,
   means rotarily connecting the coupling and stem where engaged,
   the key-operated means being located in out of alignment relation with the actuator so that blows on the actuator are not transferred to the key-operated means in any position of the coupling.

2. The valve of claim 1 wherein the coupling and actuator are correspondingly non-circular relative to the coupling, and the means urging the coupling toward the stem including a spring on the actuator engaging the coupling at an edge on the latter opposite the said uninterrupted edge of the coupling and a stop on the actuator limiting the spring.

* * * * *